United States Patent
Collombin

[19]
[11] Patent Number: 5,876,768
[45] Date of Patent: Mar. 2, 1999

[54] MACHINES FOR THE PRODUCTION OF RECEPTACLES OF PLASTIC MATERIAL

[75] Inventor: Andre-Marcel Collombin, Versoix, Switzerland

[73] Assignee: Tetra Laval Holdings & Finance SA, Pully, Switzerland

[21] Appl. No.: 981,394
[22] PCT Filed: Jul. 16, 1996
[86] PCT No.: PCT/IB96/00702
    § 371 Date: Dec. 31, 1997
    § 102(e) Date: Dec. 31, 1997
[87] PCT Pub. No.: WO97/03805
    PCT Pub. Date: Feb. 6, 1997

[30] Foreign Application Priority Data

Jul. 19, 1995 [CH] Switzerland ............................ 2122/95

[51] Int. Cl.⁶ ............................ B29C 49/68; B29C 31/08
[52] U.S. Cl. ...................... 425/174.4; 264/454; 264/535; 425/526; 425/529; 425/534
[58] Field of Search .................... 425/526, 529, 425/534, 174.4; 264/535, 454, 458, 459

[56] References Cited

U.S. PATENT DOCUMENTS

| | | | |
|---|---|---|---|
| 3,149,373 | 9/1964 | Marzillier | 425/526 |
| 3,339,230 | 9/1967 | Farrell | 425/526 |
| 3,449,792 | 6/1969 | Plummer | 425/526 |
| 3,852,398 | 12/1974 | Moore | 425/534 |
| 4,050,887 | 9/1977 | Berggren et al. | 425/526 |
| 4,354,813 | 10/1982 | Collumbin | 425/526 |
| 4,690,633 | 9/1987 | Schad et al. | 425/526 |
| 4,963,086 | 10/1990 | Wiatt et al. | 425/526 |
| 5,200,134 | 4/1993 | Collombin et al. | 425/529 |
| 5,607,706 | 3/1997 | Ingram | 425/526 |

FOREIGN PATENT DOCUMENTS

| | | |
|---|---|---|
| 266804 | 5/1988 | European Pat. Off. . |
| 683757 | 5/1994 | Switzerland . |

*Primary Examiner*—Robert Davis
*Attorney, Agent, or Firm*—Young & Thompson

[57] ABSTRACT

The machine for the production of receptacles of plastic material includes a loading device (5) in which the preforms are disposed neck down on supports (7) of double carriers (8) heated in a heating device (10) and moved into a drawing-blowing device (12). In this latter, the receptacles are formed and then discharged into a discharging device (14). In the part (21) of the guide track (20) the supports (7) and the preforms are aligned in a single row, whilst in the part (22) the supports (7) and the preforms are arranged in a plurality of parallel rows. Between each row of preforms of a row of carriers (8), the heating device (10) includes a heating body (42) arranged so as to heat bidirectionally the preforms located on each side of the heating body (42). The heating device can moreover be raised from an active position to an inactive position and vice versa. There is thus obtained a machine with a very high output, of reduced size and low consumption of energy.

42 Claims, 6 Drawing Sheets

MACHINES FOR THE PRODUCTION OF RECEPTACLES OF PLASTIC MATERIAL

CROSS-REFERENCE TO RELATED APPLICATION

This application is the 35 USC 371 National stage of International application PCT/IB96/00702 which was filed on Jul. 16, 1996 and designated the United States of America.

FIELD OF THE INVENTION

The present invention relates to a machine for the production of receptacles of plastic material comprising a frame and, arranged along a guide path, at least one heating device and a blow molding device, the receptacles being formed from preforms disposed on carriers displaced along the guide path.

BACKGROUND OF THE INVENTION

A machine of this type is described in Swiss patent 683.757 and comprises a guide path on which carriers bearing a preform are moved through the various production steps and devices. The carriers and the preforms comprise a single row moving at a single speed. Given that the heating of the preforms is a relatively long operation, the length of the guide path must be fairly great to obtain suitable heating, which greatly increases the overall size of the machine, or else the speed of the preforms along the entire circuit must be lowered as a result, which considerably reduces the output of the machine.

SUMMARY OF THE INVENTION

The present invention has for its object to overcome these drawbacks and to provide a machine of high output and low volume. The machine according to the invention is characterized to this end by the fact that the guide path comprises at the heating device a number of rows of preforms parallel to the direction of movement, at least twice as great as the number of parallel rows of preforms at the blow molding device.

Thus, while increasing the number of parallel rows of preforms at the heating device relative to the number of parallel rows along the rest of the circuit and particularly of the molding device, the production output can be very high, whilst considerably decreasing the overall size of the machine.

Preferably, the guide path comprises at the blow molding device a single row of preforms aligned in the direction of movement, whilst it comprises at the heating device a number of parallel rows of preforms comprised between two and twelve, preferably six.

There is thus obtained optimum adjustment of the heating time for the preforms adapted to the duration of molding or draw-blowing, permitting a high output with a very short guide path, hence with a reduced size of the machine.

According to a preferred embodiment, the blow molding device comprises at least one row of n mold cavities aligned parallel to the direction of movement, the guide path comprising at the heating device n rows of preforms parallel to the direction of movement.

Thus, the n preforms leaving the heating device can be directly loaded into the molding device with a single movement or transport cycle, which permits very reliable and sensible production.

According to a preferred embodiment, the guide path comprises a portion having a general U shape and a second portion connecting by a straight line the arms of the U.

In this embodiment, the first portion comprises the blow molding device, a device for loading produced receptacles and a device for loading preforms, the second portion comprising the heating device.

The central free space of the machine is thus used in an optimal manner for heating the preforms contained in the heating device serving also as a storage, which gives optimum arrangement of the various devices of the machine.

According to a preferred embodiment, each carrier comprises a plate mounted slidably on the guide path, each plate carrying two supports each adapted to receive one preform.

By this arrangement, the movement of the preforms is effected in a precise manner, not only in the heating device but also in the molding device. Moreover, the changes of direction of the transport are easily effected.

Preferably, the carriers are of generally rectangular form and comprise, aligned along their greater length, two bearings in which the supports are mounted and retained rotatably.

These supports can preferably be constituted by tubular members comprising at their upper end an annular holding element in which the preforms are retained by their neck, the tubular members passing through said bearings and being provided at their lower end with a pinion adapted to coact with a drive device arranged on the heating device to drive in rotation said supports and preforms, the guide path comprising rails on which the supports rest, said bearings comprising grooves adapted to coact with the rails so as to be retained on the guide path.

This construction ensures a very rapid mounting of the assembly of the carriers and reliable operation of the overall steps and production devices of the machine.

According to a particularly preferred embodiment, the heating device comprises at least one heating body of elongated form arranged between two parallel rows of preforms and adapted to emit heating radiation on two opposite sides in the direction of the two rows of preforms.

The heating of the preforms is thus achieved in an efficacious manner, whilst considerably decreasing the energy consumption.

Preferably, each heating body comprises a plurality of flat bidirectional superposed carbon heating tubes.

These heating tubes are particularly well adapted for the machines in question and ensure efficacious, regular and very economical heating.

The heating device comprises in a preferred manner a number of heating bodies ranging between one and six, preferably three, these heating bodies being arranged parallel to each other, each heating body being disposed substantially in the middle of the two preforms carried by each carrier.

The heating device can also work parallel to a large number of preforms, which ensures high output of the machine whilst realizing significant savings of energy.

According to a favorable embodiment, the heating body or bodies are mounted movably relative to the frame of the machine to be displaced from an active position in which they are disposed substantially facing the preforms, to an inactive position in which they are spaced from the preforms.

During interruptions in production, the preforms are damaged by overheating. This construction permits avoiding this large drawback and imparting to the machine a reliable operation.

BRIEF DESCRIPTION OF THE DRAWINGS

Other advantages will appear from the characteristics set forth in the dependent claims and the description hereinafter of the invention, in greater detail, with the help of drawings which show schematically and by way of example one embodiment and modifications.

DETAILED DESCRIPTION OF THE INVENTION

Figure 1:
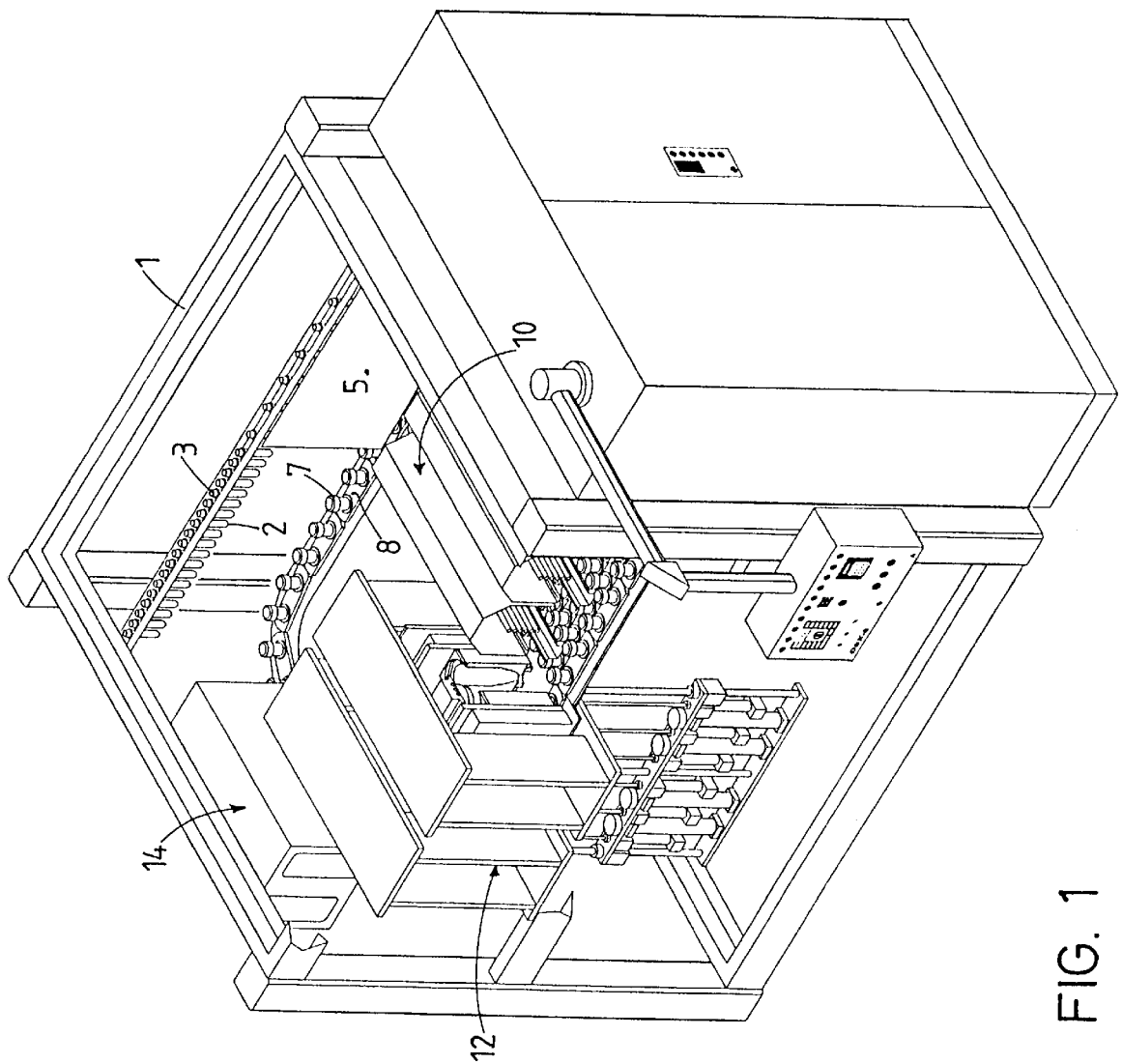
FIG. 1 is a perspective view of the embodiment of the machine.
Figure 2:
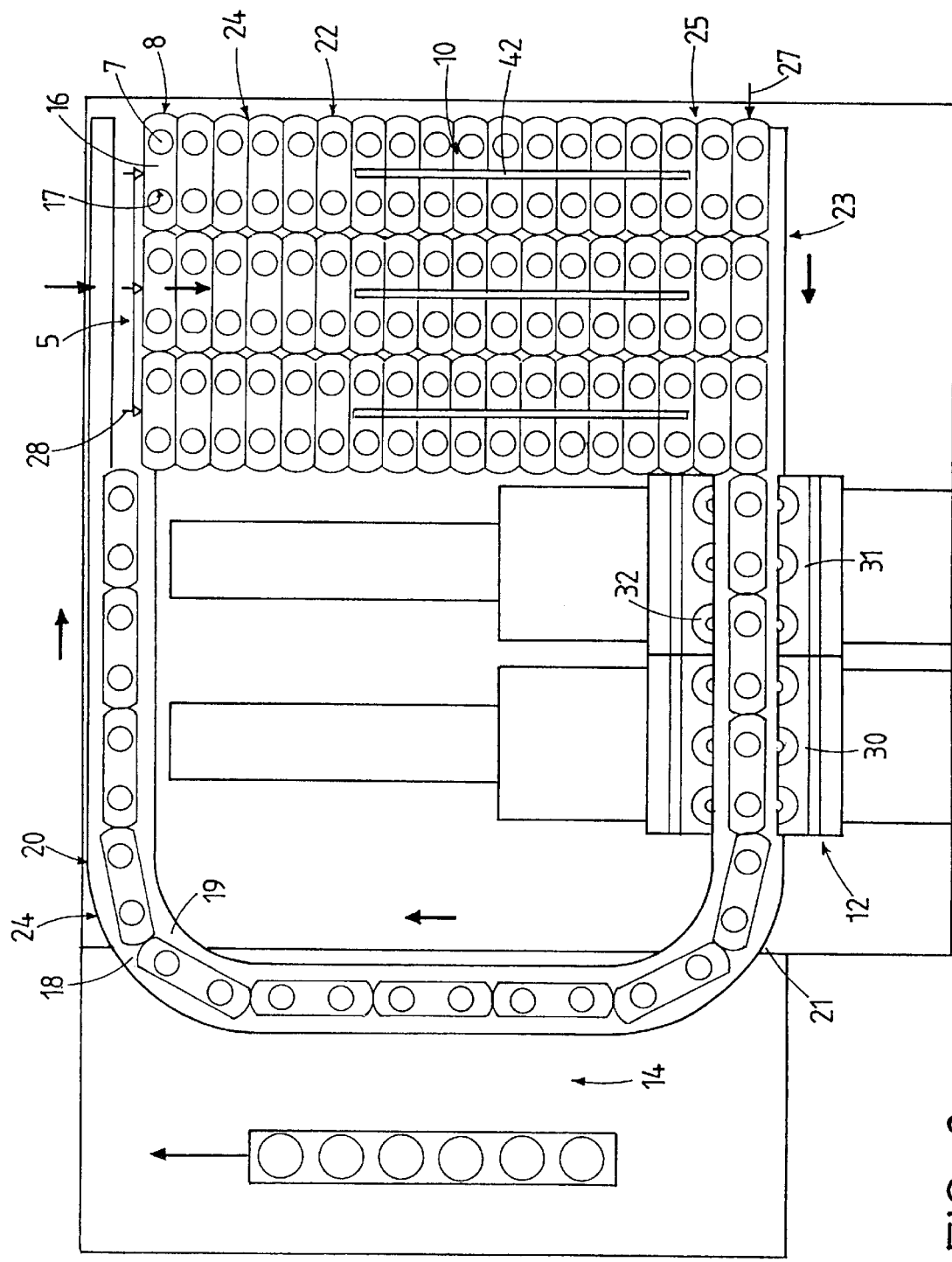
FIG. 2 is a schematic plan view of this embodiment.

Referring to FIGS. 1 and 2, the machine for producing receptacles of plastic material comprises a frame 1 on which the different devices and members of the machine are mounted in modular manner. Preforms 2 for the receptacles to be produced are supplied by means of a double rail 3 (FIG. 1) comprising an inverting loading device, in which the preforms are inverted and disposed neck down in supports 7 carried by carriers 8, each carrier having two supports 7.

The preforms 2 are then heated in a heating device 10 and brought to a drawing-blowing device 12. After their formation, the receptacles are raised from the support 7 into an inverting discharging device 14, from which they can be packaged for their future use or brought to stations for sterilization, filling, labelling, packaging, etc.

The empty supports 7 carried by the carriers 8 are then brought to the loading device 5 for the preforms.

The carriers 8 are constituted by plates 16 of elongated rectangular shape with rounded ends comprising holes 17 in which the supports 7 are maintained. The plates 16 rest laterally on a guide track 20 comprising two lateral rails 18, 19 which touch each other. This guide track comprises two distinct parts 21, 22.

A first part 21 comprises the outlet 23 of the heating device 10, the drawing-blowing device 12, the discharge device 14 and the connection path 24 toward the loading device 5 and the device for loading preforms 2. In this first portion 21, the plates 16 touch each other by their rounded ends and are aligned with each other forming a single row of supports 7 and preforms 2.

On the contrary, in the second part 22 of the guide track 20, the plates 19 are in contact by their long sides and form three rows of parallel plates, hence six parallel rows of supports 7, the two supports 7 of each carrier 8 being aligned in a direction perpendicular to the direction of movement of the carriers.

Of course the number of parallel rows of carriers 8 could be less than or greater than three according to the uses and the size of the machine. This part 22 will nevertheless comprise at least two parallel rows of supports 7 aligned in the direction of movement and will include the guide path in the heating device 10, as well as its inlet 24 and its outlet 25.

The movement of the carriers 8 in the first and second parts 21, 22 of the guide path is obtained by pressure by means of jacks schematically shown at 27 and 28. Given that this guide track 20 constitutes a closed circuit, the linear speed of displacement is about six times greater in the first part 21 relative to the second part 22. This permits gradual and optimum heating of the preforms during a prolonged period of time. As the heating phase of the preforms requires a longer time than the other phases and operations of production, there is obtained a continuous operation with a very high production, whilst reducing the length of the production path and hence the overall size of the machine.

Referring to FIG. 2, the drawing-blowing device 12 comprises two molding members 30, 31 each comprising three mold cavities 32. As the molding members are actuated simultaneously, there are obtained six molded receptacles per molding cycle. Such a cycle is typically of a duration of three seconds, which permits a production of 7200 receptacles per hour, whilst obtaining a heating of a sufficient duration in the heating device 10.

The construction of this heating device 10 is explained in greater detail with reference to FIGS. 3 to 6 and comprises an oven 40 with a movable frame 43 mounted vertically slidably on the frame 1. Thanks to pneumatic jacks 41, this oven 40 can be raised from an active position (FIG. 4B and 5) toward an inactive position (FIG. 4A) during a break in production or during stopping or starting of the machine. Thus, the large number of preforms in the oven are not harmed. Thus, even when the oven is shut off during an interruption, the remaining heat risks damaging severely the preforms located in the oven. With a mobile oven, this drawback is entirely overcome.

The oven 40 comprises three heating bodies 42 suspended from the movable frame 43. Each heating body comprises six carbon blade bidirectional heating tubes 44 extending longitudinally over the major portion of the oven. These tubes 44 are arranged so as to emit heating radiation directed to two opposite sides.

The heating bodies 42 are in active position disposed between two rows of preforms so as to heat simultaneously the preforms 2 of the two rows. Each heating body 42 and the two rows of preforms associated therewith are supported by a heating hood 46 secured to the frame 43 and provided with insulating plates 47 of a refractory material, such as alumina. On the oven, the supports 7 for the preforms are protected by a protective profile 48. Fans 49 (FIG. 5) arranged at the inlet and outlet of the oven 40 ensure circulation of the air in the heating zone.

Figure 6:
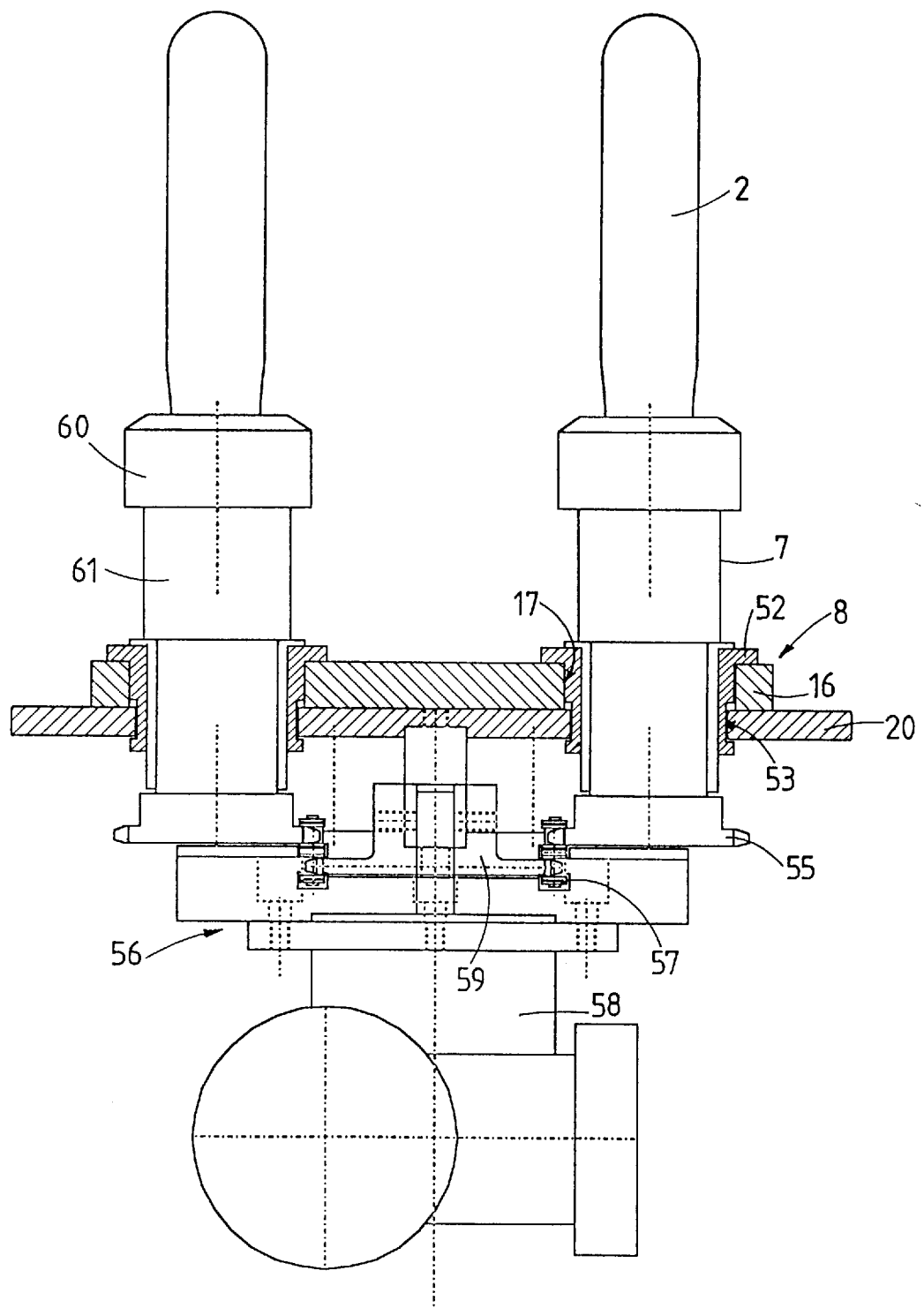
FIG. 6 is a cross-sectional view through a carrier whose supports and preforms are driven in rotation at the heating device.

Referring to FIG. 6, the preforms 2 are disposed, neck down, in the upper portion of the support 7, constituted by an annular retaining member 60. The supports 7 comprise a tubular portion 61 passing through bearings 52 engaged in holes 17 of the plates 16. These bearings 52 are also retained by means of an annular groove 53 on the rails of the guide track 20 on which the plates 16 rest.

The supports 7 are, at their lower end, secured to a drive pinion 55.

The second part 22 of the guide track 20 is provided with three rotative drive mechanisms 56 for the preforms 2. These mechanisms 56 each comprise a double chain or pulley 57 arranged parallel to the guide track between two pinions and driven by a motor 58. This motor drives a pinion 59 engaging with the lower portion of the double chain 57, whilst the upper portion of the double chain 57 coacts with the pinions 55 of the supports 7 to drive the latter in rotation. Thus, the preforms 2 disposed on the two sides of the heating body 40 are continuously rotated during their passage through the heating device 10. The guide track thus comprises three drive mechanisms 56, disposed between two adjacent rows of supports 7.

Figure 3A:
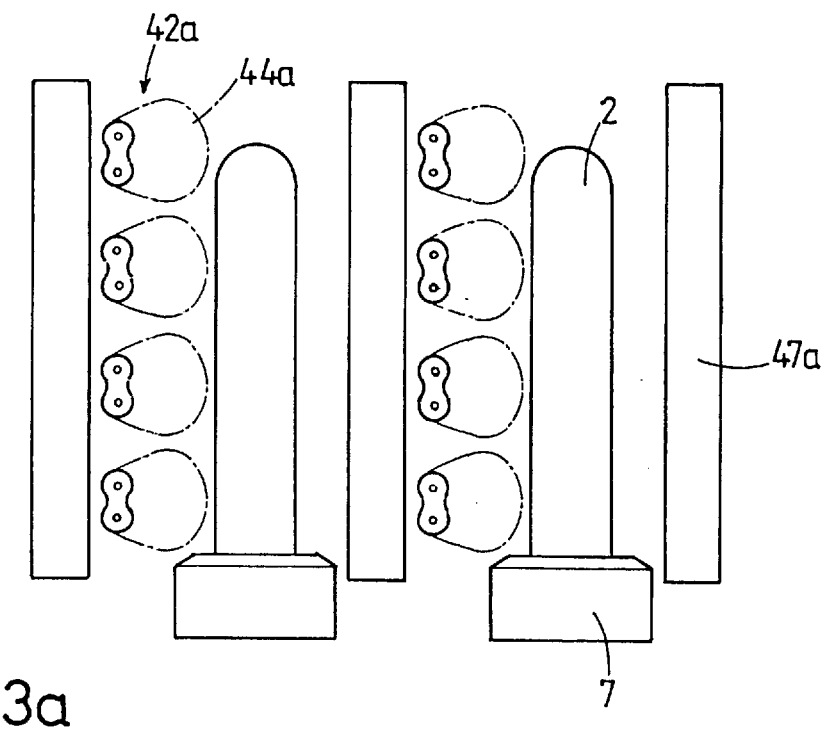
FIG. 3A shows the heating bodies of a conventional heating device.
Figure 3B:
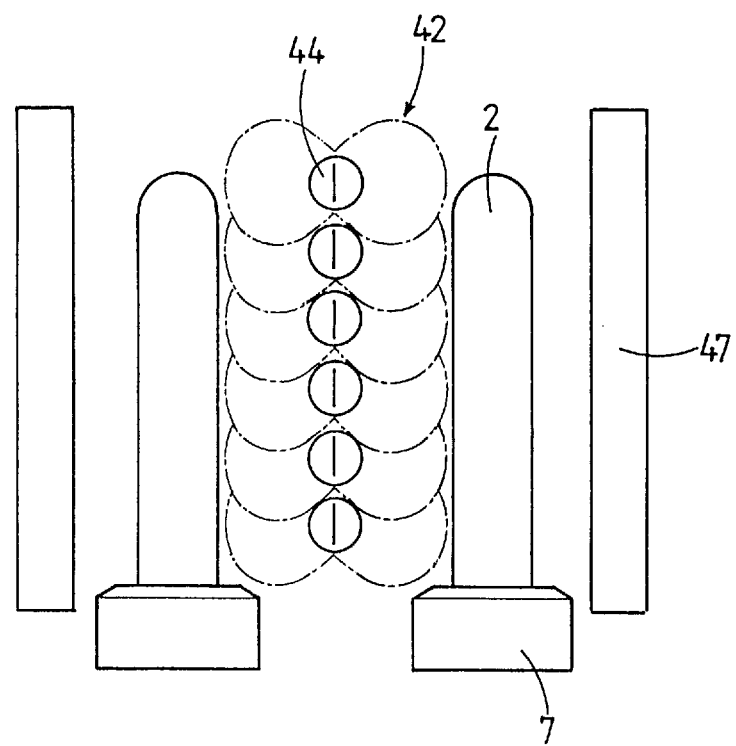
FIG. 3B shows the heating bodies of the heating device used in the present invention.
Figure 4A:
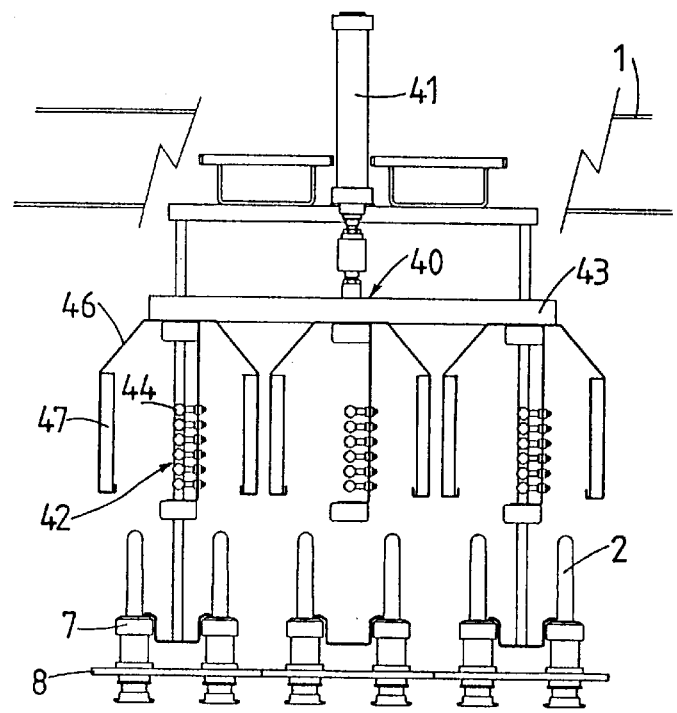
FIGS. 4A and 4B are front views of the heating device respectively in inactive and active positions.
Figure 4B:
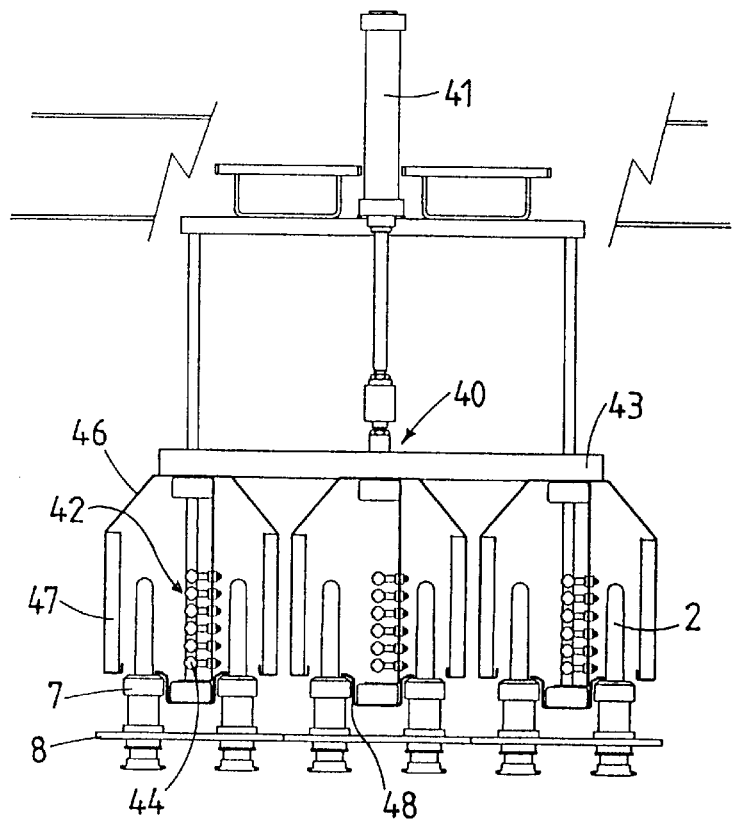
Figure 5:
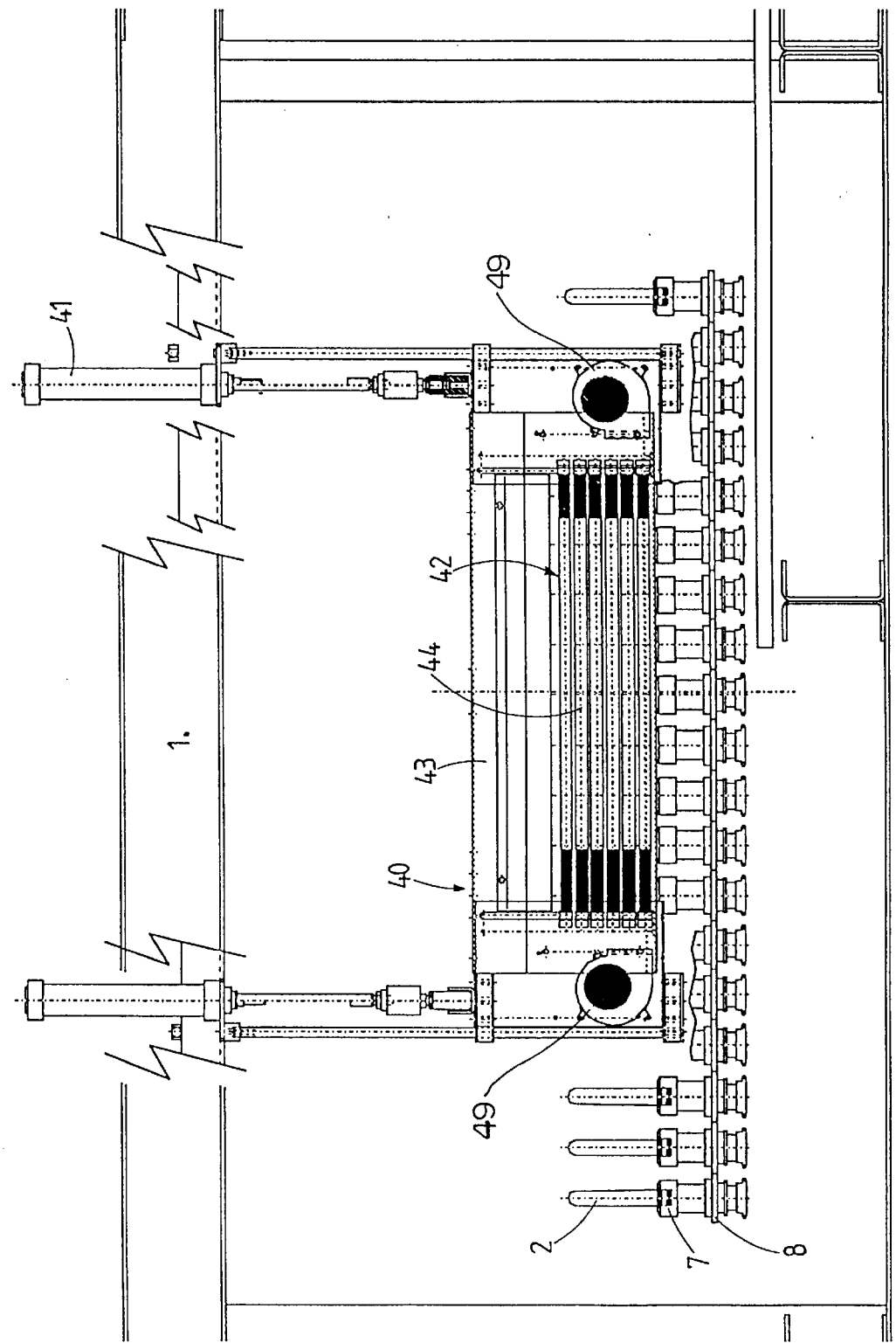
FIG. 5 is a longitudinal cross-sectional view of the heating device in active position.

FIG. 3A shows a conventional heating body 42a comprising a certain number of tungsten lamps or tubes 42a which permit heating radiation to be directed solely on one of their sides. It is therefore necessary to provide a heating body provided with an insulating plate 47a for each row of the preforms.

The heating body 42 (FIG. 3B) according to the present invention is provided with carbon bidirectional heating blade tubes 44 permitting emitting more regular radiation, distributed to two opposite sides of the heating body 42. A single heating body therefore permits treating simultaneously two rows of rotating preforms 2.

The heating body 42 according to the present invention (FIG. 3B) using carbon tubes each of a power of 2 kW permits substantial saving of energy, whilst obtaining a more regular heating relative to conventional heating bodies (FIG. 3A) using 2×4 tungsten tubes with a power of 4.2 kW each.

The combination of the heating device 10 with a bidirectional heating body 42 and of the guide track 20 comprising a part 22 with a plurality of parallel rows of preforms associated with the heating device 10 and a part 21 having only one row of preforms for the other phases of production, permits obtaining an excellent synchronization of the different phases and operations carried out along the guide track 20 of the machine, whilst reducing considerably the overall size of this latter.

This machine is particularly well adapted for the production of receptacles of polyethylene terephthalate.

According to a modification, it will be possible to provide carriers comprising another number of supports 7 than two, this number could for example be comprised between one and six.

According to other modifications, it would be possible to provide a guide track 20 comprising even in its first part 21, at the drawing-blowing device, two or several rows of preforms parallel to the direction of movement. The guide track would then comprise in the second part 22 at the heating device a number of parallel rows of preforms 2 at least twice as large as the number of parallel rows of preforms in the first part 21. Thus, the speed of movement of the preforms at the heating device 10 would be at least twice as low as the speed at the drawing-blowing device.

The guide track 20 would comprise in its second part 22 according to its uses, a number of parallel rows of preforms comprised between two and twelve and preferably six, as illustrated in FIG. 2.

If the drawing-blowing device 12 comprises at least one row of n mold cavities 32 aligned parallel to the direction of movement, the guide track 20 will preferably comprise in its second part 22 n rows of parallel preforms 2. Thus, the n preforms arriving at the end of the second part 22 of the guide track 20, can be introduced together into a transport cycle in the drawing-blowing device 12, which could be constituted by any blow molding device, with or without a drawing rod.

In the embodiment of FIG. 2, n is equal to six, but this number could, in modified embodiments, be equal to a number comprised between two and twelve.

It is to be noted that the direction of movement of the preforms 2 in the second part 22 of the guide track 20 is substantially perpendicular to the direction of movement of the preforms 2 in the first part 21 of this guide track at the drawing-blowing device and of the loading device 5. Thus, the first part 21 of the guide track 20 has preferably the general shape of a U whose legs are connected in a straight line by the second part 22 of the guide track 20. This latter serves as a sort of storage with a low speed of movement of the preforms, permitting gradual and regular heating of these preforms.

Of course the embodiment and the modifications described above are in no way limiting and they can be the subject of any desired modifications within the scope defined in the appended claims. In particular, the movement of the carriers 8 can be effected by any other actuating means, such as drive pulleys and chains, indexed wheels coacting with the supports 7 or with the carriers 8. The guide track 20 could, particularly in its first part 21, have quite another form, for example a semi-circle or an irregular shape. The machine can be connected directly or indirectly to other devices performing a further treatment of the receptacles, it could also be preceded by an installation for production of the preforms.

I claim:

1. Machine for the production of receptacles of plastic material, comprising a frame and arranged along a guide track at least one heating device and a blow molding device, the receptacles being formed from preforms disposed on carriers moved along the guide track, the guide track including at the heating device a number of rows of preforms parallel to the direction of movement, at least twice as great as the number of parallel rows of preforms at the blow molding device, said heating device comprising a number of heating bodies of elongated shape arranged between two parallel rows of preforms and adapted to emit heating radiation to two opposite sides in the direction of the two rows of preforms, each heating body comprising a plurality of carbon bidirectional blade heating tubes that are superposed.

2. The machine according to claim 1, wherein the guide track comprises at the blow molding device a single row of preforms aligned in the direction of movement, whilst the guide track comprises at the heating device a number of parallel rows of preforms comprised between two and twelve.

3. The machine according to claim 1, wherein the blow molding device comprises at least one row of n mold cavities aligned parallel to the direction of movement, the guide track comprising at the heating device n rows of preforms parallel to the direction of movement.

4. The machine according to claim 3, wherein n is comprised between two and twelve.

5. The machine according to claim 1, wherein the direction of movement of the preforms on the guide track at the heating device is substantially perpendicular to the direction of movement of the preforms at the blow molding device.

6. The machine according to claim 5, wherein the guide track comprises a first part of generally U shape and a second part connecting in a straight line the legs of the U.

7. The machine according to claim 6, wherein the first part comprises the blow molding device, a discharge device for the produced receptacles and a loading device for the preforms, and the second part comprises the heating device.

8. The machine according to claim 1, wherein each carrier comprises a plate mounted slidably on the guide track, each plate carrying two supports adapted each to receive one preform.

9. The machine according to claim 8, wherein the carriers are of generally rectangular shape and comprise, aligned along their greater length, two bearings in which the supports are mounted and retained rotatably.

10. The machine according to claim 9, wherein the supports are constituted by tubular members comprising at their upper end an annular holding element in which the preforms are retained by their neck, the tubular members passing through said members and being provided at their lower end with a pinion adapted to coact with a drive device arranged at the heating device to drive in rotation said support and preforms, the guide track comprising rails on which the supports rest, said bearing comprising grooves adapted to coact with the rails so as to be retained on the guide track.

11. The machine according to claim 8, wherein the carriers are disposed on the guide track, such that the two supports of each carrier will be aligned in the direction of movement at the blow molding device and such that the two supports of each carrier will be aligned in a direction perpendicular to the direction of movement at the heating device.

12. The machine according to claim 8, wherein said machine comprises at the heating device between one and six rows of carriers, said rows of carriers being aligned side by side in the direction of movement.

13. The machine according to claim 12, wherein the heating device comprises a number of heating bodies comprised between one and six, said heating bodies being arranged parallel to each other, each heating body being disposed substantially in the middle of two preforms carried by each carrier.

14. The machine according to claim 13, wherein each heating body and the two adjacent rows of preforms are surrounded by a hood.

15. The machine according to claim 14, wherein the heating bodies surrounded by their hood are mounted on a movable frame, which is adapted to be displaced vertically under the action of a lifting device.

16. Machine for the production of receptacles of plastic material, comprising a frame and arranged along a guide track at least one heating device and a blow molding device, the receptacles being formed from preforms disposed on carriers moved along the guide track, the guide track including at the heating device a number of rows of preforms parallel to the direction of movement, at least twice as great as the number of parallel rows of preforms at the blow molding device, said heating device comprising a number of heating bodies of elongated shape arranged between two parallel rows of preforms and adapted to emit heating radiation to two opposite sides in the direction of the two rows of preforms, and means for moving the heating bodies relative to the frame of the machine from an active position in which they are disposed substantially facing the preforms to an inactive position in which they are spaced from the preforms.

17. The machine according to claim 16, wherein the guide track comprises at the blow molding device a single row of preforms aligned in the direction of movement, whilst the guide track comprises at the heating device a number of parallel rows of preforms comprised between two and twelve.

18. The machine according to claim 16, wherein the blow molding device comprises at least one row of n mold cavities aligned parallel to the direction of movement, the guide track comprising at the heating device n rows of preforms parallel to the direction of movement.

19. The machine according to claim 18, wherein n is comprised between two and twelve.

20. The machine according to claim 16, wherein the direction of movement of the preforms on the guide track at the heating device is substantially perpendicular to the direction of movement of the preforms at the blow molding device.

21. The machine according to claim 20, wherein the guide track comprises a first part of generally U shape and a second part connecting in a straight line the legs of the U.

22. The machine according to claim 21, wherein the first part comprises the blow molding device, a discharge device for the produced receptacles and a loading device for the preforms, and the second part comprises the heating device.

23. The machine according to claim 16, wherein each carrier comprises a plate mounted slidably on the guide track, each plate carrying two supports adapted each to receive one preform.

24. The machine according to claim 23, wherein the carriers are of generally rectangular shape and comprise, aligned along their greater length, two bearings in which the supports are mounted and retained rotatably.

25. The machine according to claim 24, wherein the supports are constituted by tubular members comprising at their upper end an annular holding element in which the preforms are retained by their neck, the tubular members passing through said members and being provided at their lower end with a pinion adapted to coact with a drive device arranged at the heating device to drive in rotation said support and preforms, the guide track comprising rails on which the supports rest, said bearing comprising grooves adapted to coact with the rails so as to be retained on the guide track.

26. The machine according to claim 23, wherein the carriers are disposed on the guide track, such that the two supports of each carrier will be aligned in the direction of movement at the blow molding device and such that the two supports of each carrier will be aligned in a direction perpendicular to the direction of movement at the heating device.

27. The machine according to claim 23, wherein said machine comprises at the heating device between one and six rows of carriers, said rows of carriers being aligned side by side in the direction of movement.

28. The machine according to claim 27, wherein the heating device comprises a number of heating bodies comprised between one and six, said heating bodies being arranged parallel to each other, each heating body being disposed substantially in the middle of two preforms carried by each carrier.

29. The machine according to claim 28, wherein each heating body and the two adjacent rows of preforms are surrounded by a hood.

30. The machine according to claim 29, wherein the heating bodies surrounded by their hood are mounted on a movable frame, which is adapted to be displaced vertically under the action of a lifting device.

31. Machine for the production of receptacles of plastic material, comprising a frame and arranged along a guide track at least one heating device and a blow molding device, the receptacles being formed from preforms disposed on carriers moved along the guide track, the guide track including at the heating device a number of rows of preforms parallel to the direction of movement, at least twice as great as the number of parallel rows of preforms at the blow molding device, each carrier comprising a plate mounted slidably on the guide track, each plate carrying two supports adapted each to receive one preform, said heating device comprising a number of heating bodies comprised between one and six, said heating bodies being arranged parallel to each other, each heating body being disposed substantially in the middle of two preforms carried by each carrier, and each heating body and the two adjacent rows of preforms being surrounded by a hood.

32. The machine according to claim 31, wherein the guide track comprises at the blow molding device a single row of preforms aligned in the direction of movement, whilst the guide track comprises at the heating device a number of parallel rows of preforms comprised between two and twelve.

33. The machine according to claim 31, wherein the blow molding device comprises at least one row of n mold cavities aligned parallel to the direction of movement, the guide track comprising at the heating device n rows of preforms parallel to the direction of movement.

34. The machine according to claim 33, wherein n is comprised between two and twelve.

35. The machine according to claim 31, wherein the direction of movement of the preforms on the guide track at the heating device is substantially perpendicular to the direction of movement of the preforms at the blow molding device.

36. The machine according to claim 35, wherein the guide track comprises a first part of generally U shape and a second part connecting in a straight line the legs of the U.

37. The machine according to claim 36, wherein the first part comprises the blow molding device, a discharge device for the produced receptacles and a loading device for the preforms, and the second part comprises the heating device.

38. The machine according to claim 31, wherein the carriers are of generally rectangular shape and comprise, aligned along their greater length, two bearings in which the supports are mounted and retained rotatably.

39. The machine according to claim 38, wherein the supports are constituted by tubular members comprising at their upper end an annular holding element in which the preforms are retained by their neck, the tubular members passing through said members and being provided at their lower end with a pinion adapted to coact with a drive device arranged at the heating device to drive in rotation said support and preforms, the guide track comprising rails on which the supports rest, said bearing comprising grooves adapted to coact with the rails so as to be retained on the guide track.

40. The machine according to claim 31, wherein the carriers are disposed on the guide track, such that the two supports of each carrier will be aligned in the direction of movement at the blow molding device and such that the two supports of each carrier will be aligned in a direction perpendicular to the direction of movement at the heating device.

41. The machine according to claim 31, wherein said machine comprises at the heating device between one and six rows of carriers, said rows of carriers being aligned side by side in the direction of movement.

42. The machine according to claim 31, wherein the heating bodies surrounded by their hood are mounted on a movable frame, which is adapted to be displaced vertically under the action of a lifting device.

* * * * *